United States Patent Office 3,066,144
Patented Nov. 27, 1962

3,066,144
ESTERS OF PROTOVERINE
S. Morris Kupchan, Madison, Wis., assignor to Wisconsin Alumni Research Foundation, Madison, Wis., a corporation of Wisconsin
No Drawing. Filed Aug. 11, 1960, Ser. No. 48,816
16 Claims. (Cl. 260—287)

The present invention relates to new esters of desatrine which can be identified chemically as protoverine 3-R, 6, 7-diacetate 15 (1)-2'-methylbutyrate, where R represents an acyloxy group as noted below.

Desatrine (protoverine 6,7-diacetate 15 (1)-2'-methylbutyrate) can be prepared as follows.

EXAMPLE I

*Protoverine 6,7-diacetate 15 (l)-2'-methylbutyrate.*—A solution of protoveratrine B, M.P. 267–269° C., in 5% acetic acid (15 ml.) was treated with 0.08M sodium periodate (38 ml.) and allowed to stand at room temperature for 5 hours. The solution was cooled in ice, made alkaline with dilute ammonium hydroxide and extracted with chloroform. The chloroform extract was dried over anhydrous sodium sulfate and evaporated to yield a resin which was chromatographed on acid washed alumina (15 g.). The column yielded to benzene a yellow oil and to 50% chloroform-benzene a resin. Elution with chloroform gave a white solid (desatrine) which was crystallized from acetone-petroleum ether as needles, M.P. 233–236° C. A sample was recrystallized for analysis from acetone-petroleum ether as needles, M.P. 232–233° C.

Desatrine can also be prepared from protoveratrine B by the modified process described in the copending application of S. Morris Kupchan, Serial No. 857,498, filed December 7, 1959, now Patent 3,009,917.

The general procedure for preparation of the new esters involved treatment of desatrine in pyridine or the like at about 0° C. with stirring with 2–3 molecular equivalents of the specified acid halide (chloride or bromide). After one hour, the reaction mixture was allowed to come to room temperature and stand 20 to 48 hours. The mixture was treated with dilute aqueous alkali, e.g. ammonium hydroxide to pH 8–9, and extracted exhaustively with a water immiscible organic solvent such as chloroform; and the resulting organic solvent solution evaporated to dryness under reduced pressure. Chromatography of the residual solid alkaloid mixture with crystallization in acetone-petroleum ether or the like then afforded the crystalline desatrine monoesters. The following examples will serve to illustrate the invention.

EXAMPLE II

*Desatrine 3-benzoate.*—To a solution of desatrine (0.65 g.) in pyridine (1 ml.) was added benzoyl chloride (1.2 ml.) at 0° C. and the solution was left for one hour at 0° C. and 48 hours at room temperature. The mixture was made alkaline with 10% aqueous ammonia, extracted with chloroform, and the chloroform solution was evaporated to dryness in vacuo. Chromatography on acid washed alumina in the usual manner gave 285 mg. of desatrine 3-monobenzoate, M.P. 240–241° C. dec.

EXAMPLE III

*Desatrine 3-p-nitrobenzoate.*—A solution of desatrine (700 mg., 1×10⁻³M) in pyridine (5 ml.) was treated at 0° C. with stirring with p-nitrobenzoyl chloride (370 mg., 2×10⁻³M). After one hour at 0° C., the reaction was allowed to stand at room temperature for 48 hours. The mixture was then heated to 60° C. for one hour. Workup in the usual manner gave a residue (800 mg.) which was crystallized from acetone-petroleum ether in the form of yellow needles, M.P. 175–177° C.

EXAMPLE IV

*Protoverine 3,3'- bromoangelate 6,7-diacetate 15 (l)-2'-methylbutyrate.*—Protoverine 6,7-diacetate 15 (1)-2'-methylbutyrate, M.P. 233–233° C. was dissolved in pyridine (10 cc.) cooled to −10° C. and treated with 3-bromoangeloyl chloride (0.2 cc.). The mixture was stirred until a clear yellow solution was obtained. The solution was allowed to come to room temperature and stand overnight. The pH was brought to 9 with dilute ammonia and the mixture extracted thoroughly with chloroform. The chloroform extract was dried over anhydrous sodium sulfate and evaporated to yield a brown resin. The resin was chromatographed on acid washed alumina (15 g.). The column yielded to benzene, benzene-chloroform and chloroform a series of yellow oils. When developed with chloroform-1% methanol, however, an amorphous solid material was obtained (110 mg.) $(\alpha)_D^{26}$ +28° (c. 0.8 pyr.).

In a similar manner to that described above the following esters can be prepared by the use of the appropriate acid chloride.

Table I

| Acyl Chloride | Desatrine Derivative (3-substituent) | M.P., ° C., dec. or $[\alpha]_D$ | Crystal Form |
|---|---|---|---|
| acetyl | acetate | 253–254 | needles. |
| isobutyryl | isobutyrate | 188–190 | prisms. |
| capryl | caprate | $[\alpha]_D^{24}$ −7° (pyr.) | amorphous. |
| chloroacetyl | chloroacetate | 190–205 | prisms. |
| trichloroacetyl | trichloroacetate | 185–190 | prisms. |
| 4'-nitrocaproyl | 4'-nitrocaproate | 187–188 | needles. |
| benzoyl | benzoate | 240–241 | prisms. |
| 4'-nitrobenzoyl | 4'-nitrobenzoate | 175–177 | needles. |
| 4'-aminobenzoyl | 4'-aminobenzoate | $[\alpha]_D^{24}$ +47° (pyr.) | amorphous. |
| 3',4'-methylene dioxybenzoyl. | 3',4'-methylene dioxybenzoate. | 221–222 | micro needles. |
| tosyl | tosylate | 213–215 | prisms. |
| nicotinyl | nicotinate | 237–239 | prisms. |
| tigloyl | tiglate | 219–220 | ellipsoids. |
| diethylphosphoryl | diethylphosphate. | 203–204 | needles. |

EXAMPLE V

*Desatrine 3-(N,N-diethylaminoacetate).*—A solution of desatrine 3-chloroacetate (260 mg.) in dry benzene (10 cc.) was treated with diethylamine (1 cc.) and the mixture was allowed to stand in a stoppered flask at room temperature for 48 hours. Evaporation to dryness under reduced pressure yielded a residue which was treated with dilute ammonium hydroxide and extracted with chloroform. The chloroform extract was dried over anhydrous sodium sulfate and evaporated to dryness under reduced pressure. The amorphous residue was crystallized from acetone-petroleum ether to yield colorless rosettes, M.P. 189–190° C. The crystalline product was shown by paper chromatography to be homogeneous.

The esters of desatrine are characterized by insecticidal properties and can be applied in this field in standard diluents or carriers including dusts and liquids such as kerosene. They have been found effective (LD/50) against ordinary house flies in dilutions as low as 2 mg. desatrine ester per liter of diluent. For most purposes, concentrations of around .01–1.0% by weight are generally recommended.

This application is a continuation-in-part of my copending application Serial No. 857,484, filed December 7, 1959, now abandoned.

I claim:
1. Protoverine 3-acetate, 6,7-diacetate 15 (l)-2'-methylbutyrate.

2. Provoterine 3-isobutyrate, 6,7-diacetate 15 (1)-2'-methylbutyrate.
3. Protoverine 3-caprate, 6,7-diacetate 15 (1)-2'-methylbutyrate.
4. Protoverine 3-chloroacetate, 6,7-diacetate 15 (1)-2'-methylbutyrate.
5. Protoverine 3-trichloroacetate, 6,7-diacetate 15 (1)-2'-methylbutyrate.
6. Protoverine 3-(4'-nitrocaproate), 6,7-diacetate 15 (1)-2'-methylbutyrate.
7. Protoverine 3-benzoate, 6,7-diacetate 15 (1)-2'-methylbutyrate.
8. Protoverine 3-p-nitrobenzoate, 6,7-diacetate 15 (1)-2'-methylbutyrate.
9. Protoverine 3-p-aminobenzoate, 6,7-diacetate 15 (1)-2'-methylbutyrate.
10. Protoverine 3-(3',4'-methylenedioxybenzoate), 6,7-diacetate 15 (1)-2'-methylbutyrate.
11. Protoverine 3-tosylate, 6,7-diacetate 15 (1)-2'-methylbutyrate.
12. Protoverine 3-nicotinate, 6,7-diacetate 15 (1)-2'-methylbutyrate.
13. Protoverine 3-tiglate, 6,7-diacetate 15 (1)-2'-methylbutyrate.
14. Protoverine (3'-bromoangelate), 6,7-diacetate 15 (1)-2'-methylbutyrate.
15. Protoverine 3-diethylphosphate, 6,7-diacetate 15 (1)-2'-methylbutyrate.
16. Protoverine N,N-diethylaminoacetate, 6,7-diacetate 15 (1)-2'-methylbutyrate.

No references cited.